Patented Apr. 17, 1934

1,955,115

UNITED STATES PATENT OFFICE 1,955,115

STORAGE BATTERY

James Joseph Drumm, Dublin, Irish Free State, assignor to Drumm Battery Company Limited, Dublin, Irish Free State No Drawing. Application September 6, 1930, Serial No. 480,277. In Great Britain October 29, 1929

4 Claims. (Cl. 136—31)

This invention relates to secondary or storage batteries or electric accumulators with particular reference to those employing an alkaline electrolyte.

Such alkaline storage batteries as at present commercially available suffer from various defects or disadvantages amongst which may be noted the following:—

(a) The discharge voltage of each cell is relatively low (usually of the order of 1.2 volts at the usual 5-hour rates of discharge) thus necessitating a very large number of elements where relatively high voltages are required, for example, 220 volts for traction purposes.

(b) The employment of heavy currents for the purpose of boosting is limited to about five times the normal charging rate and the periods of time during which such heavy currents can be applied are limited to from 5 to 10 minutes, the rate and time of charging being limited principally by the rise in battery temperature.

(c) Relatively long periods of time (of the order of 5 to 8 hours) are necessary for a complete charge while the corresponding rates of discharge are proportionately low, rates of from 4 to 5 hours.

The object of the present invention is to devise an improved form of alkaline storage battery which will be capable of developing a relatively much higher voltage on discharge and which will not be so limited in the conditions under which it may be charged as are existing batteries, and the invention consists in an alkaline storage battery in which the active negative material consists of zinc plated out of the liquid electrolyte on to a suitable metallic surface and in such form that it readily redissolves in the electrolyte during discharge so behaving completely reversibly.

Further features of the invention will be apparent from the description given hereafter and will be more particularly pointed out in the appendant claims.

In carrying my invention into effect in one convenient manner I form each cell of my improved battery with a container composed of nickel plated steel, rustless steel or metal known under the registered trade-mark "Monel" and suitably welded either in the oxy-acetylene flame using a suitable flux or with the atomic hydrogen welding arc, the container being of the required size and shape and being adapted to contain an electrolyte consisting of a solution of caustic potash of specific gravity 1.22 to 1.25 at 15° C. Prior to employing this solution in a cell, however, it is made to dissolve zinc oxide to saturation and when this solution has been filtered it should have a specific gravity at 15° C. ranging between 1.245 to 1.275. Various forms of positive plate may be employed but in each case the depolarizer material consists of nickelic oxide or of silver oxide or a mixture of nickelic oxide and silver oxide. In one type of positive plate, which is of a design already well known commercially, the nickelic oxide is mixed with graphite or a mixture of graphite and silver oxide and the mixture is tightly packed in perforated nickeled steel pockets. If so desired, nickel threads or nickel gauze may be inserted in the pockets so as to impart better electrical conductivity to the centre layers of the filling of the pocket. Such nickel steel pockets when duly filled and folded are fitted closely together in the form of a plate. The ends of the pockets are then clamped in a nickeled steel grid or frame in a manner well understood in the art. An alternative design which is also well known commercially consists of cylindrical perforated nickeled steel tubes about 4 inches long and $\frac{3}{8}$ to 4/16th inches in diameter and provided with a double lapped spiral seam. These tubes or cylinders are further strengthened by steel rings closely fitting on the outside. The tube when being prepared is filled with several hundred alternating layers of very fine nickel flake and nickel hydrate with or without silver oxide. The filling is tightly tamped so that the nickel layers make contact with the nickel container all around the circumference. If so desired nickel threads may be substituted for the nickel flake, but it is to be understood that the nature of this invention does not in any way depend on the particular type of positive plate and any other suitable form of positive plate may be used.

Each of the negative plates or cathodes consists essentially of nickel gauze or Monel metal gauze. The former is preferred on account of its greater electrical conductivity. If preferred iron wire of suitably gauge can be nickel plated and woven into gauze. Gauze is preferred because it provides the maximum of surface per unit of superficial area, but it is also possible to use perforated plate or a plate with a knurled or corrugated surface or a plate of expanded metal sheet. When the plates are formed from gauze it is preferred to employ a single sheet of nickel, Monel metal or nickel plated iron gauze of such suitable weave as affords sufficient rigidity. The vertical edges of the gauze are clamped in a rigid nickel plated steel grid. In a particular example a 24 mesh nickel gauze was used consisting of warp wires of 31 to 32 standard wire gauge and weft wires of 22 wire gauge.

The battery produced in accordance with the invention depends for its action upon the fact that a nickel surface may be treated in such a way as to make readily possible satisfactory deposition of zinc metal from a concentrated solution of zinc oxide in caustic potash. To prepare the nickel surface of the gauze for satisfactory deposition of zinc it is necessary to treat the nickel surface to the cathodic evolution of hydrogen in ordinary caustic potash solution for several hours. During this time a change seems gradually to occur on the surface of the nickel whereby the overvoltage necessary for the discharge of hydrogen gradually rises to a value which is about that necessary for deposition of zinc in alkaline solution. No doubt the explanation of this phenomenon is associated with the surface formation on the nickel of a nickel hydrogen alloy. The preliminary preparation of such a suitable nickel surface may take as much as 20 hours continuous electrolysis but can be greatly accelerated if a little zinc oxide is dissolved in the caustic potash solution and as soon as zinc metal commences to be plated on to the nickel surface the latter is then dipped for a few seconds in 3% solution of potassium mercuric cyanide or potassium mercuric sulphocyanide, the effect of the latter treatment being to leave a trace of metallic mercury on the nickel surface. In preparing the nickel surface for normal functioning in the accumulator the nickel electrodes can be assembled together with the positives into a complete element and the preliminary "forming" of the negative, as above described, can be combined with the "forming" of the positives. The latter, as is well known, have also to be given a preliminary formation treatment before being actually employed in the accumulator. During the process of charging of the accumulator the zinc is plated out of the solution of caustic zincate on the nickel negative in the form of a dense bright deposit which is completely free from spongy or loosely adhering zinc.

During discharge the zinc dissolves quantitatively off the supporting surface and the action is thus completely reversible.

When discharging the accumulator to excess for long periods of time the addition of aluminium hydrate or of beryllium hydrate or both is advantageous and I find that such additions may be of the order of 1% of the weight of the electrolyte for aluminium hydrate and 0.5% for beryllium hydrate. These proportions may be varied as found desirable.

In an experimental element of the new accumulator the following results were obtained:—

Three positive plates were used as anodes containing as active material a mixture of nickelic oxide and graphite, the total capacity of the plates being 15 ampere hours and their combined weights 570 grammes. As negative electrodes or cathodes two nickel gauze plates corresponding in size and dimensions with the positive plates were employed, the negative plates being inserted between the positive plates and being separated therefrom by ebonite rods or separators of 12/64th of an inch in diameter. In addition, the outside grid in which the metal gauze was clamped was covered or shod with a tightly fitted ebonite slab, the function of which was to prevent the excessive currents used in charging from concentrating on the grid support of the negative plate thereby causing excessive deposition of zinc at these points. The liquid electrolyte of the composition already referred to weighed 750 grammes. As a result of a trial of this battery the internal resistance at the half-hour rate of discharge was found to be 0.0075 ohms, and when charged at 40 amperes for 8 minutes the element had a capacity of 5 ampere hours while its average voltage on discharge was 1.65 at the discharge rate of 10 amperes. The temperature rise in the element after 12 continuous cycles consisting of a charge of 40 amperes for 8 minutes followed immediately by a discharge of 10 amperes for 30 minutes was only 6–7° C. while for lower rates of discharge the temperature rise was of course less.

Where it is necessary to construct an extra large size of cell it will be seen that the radiating surface is proportionately less and accordingly it may be necessary to make provision for cooling by extra ventilation, or, alternatively, to employ a proportionately lower rate of charging. It is undersirable to allow the temperature of the new accumulator ever to exceed 35° C.

Generally speaking, the battery in accordance with the invention may be a low resistance quick-charging one or a higher capacity, higher resistance type with correspondingly lower charging currents approximately as follows:—

| Charging time | Charging rate | Capacity per lb. weight of battery | Approximate efficiency A. H. | Energy |
|---|---|---|---|---|
| 8 minutes | High | 2.5 wt. hours | 95 | 75 |
| 20 minutes | High | 6 wt. hours | 93 | 70 |
| 40 minutes | Lower | 9 wt. hours | 90 | 65 |

The pole pieces of my improved storage battery preferably consist of specially pure iron of high electrical conductivity. If desired the centre of these iron poles may be bored and tapped and stout copper poles screwed in so as to increase the conductivity of the pole and at the same time to protect the copper from possible contact with the electrolyte. As an additional guarantee against faulty surface contact between the copper and the iron, it is desirable to "tin" both the copper and the iron and to screw the copper core into the iron keeping the latter at a temperature of about 250° C. during this operation.

Where the type of positive plate employed is one in which graphite is admixed with the nickel oxide or silver oxide it will be found necessary to take steps to prevent excessive voltage drop between the tops and bottoms of such plates when using heavy currents, the reason of this being that in such types of positive plates the current is carried mainly along the vertical grids and if the latter are constructed of thin gauge steel they will offer a high ohmic resistance, the result of which would be that in the working of the accumulator heavy discharge or charge currents would tend to flow on the tops of the plates thereby causing excessive current densities and therefore excessive electro-chemical stresses on the tops of the positives. One satisfactory method of correcting this trouble in the above-mentioned type of positive plate is first of all to use high conductivity pure iron for the material of the grid and secondly to line the grid with nickel plated silver strip of such cross section or gauge as to reduce the resistance of the grid to the desired value. However, the more common type of tubular positive already described is greatly to be preferred where possible as in this style of positive the tubes are mounted vertically in the grid of the plate and therefore in themselves reinforce the conductivity of the plate under cell conditions.

For satisfactory working it is essential to keep the tops of the plates about one inch above the electrolyte in order to prevent the deposition of the zinc on the iron cross piece forming the top of the plate. Alternatively, the tops of the plates may be covered with a suitable insulator.

It is also necessary to provide approximately one inch clearance between the bottom of the plates and the bottom of the container.

The improved form of alkaline storage battery in accordance with the invention is particularly suitable for employment for traction purposes but is not to be limited to such as it may be applied generally for any purpose for which storage batteries are suitable.

Having now described my invention, what I claim as new and desire to secure by Letters Patent is:—

1. An electrical storage battery cell having some form of zinc dissolved in an alkaline electrolyte, a positive electrode comprising a depolarizer consisting of nickel oxide and a negative electrode having a surface consisting of nickel.

2. A cell as defined in claim 1 wherein the alkaline electrolyte is a solution of caustic potash.

3. A cell as defined in claim 1 wherein the negative electrode has a surface consisting of a nickel-hydrogen alloy.

4. A cell as defined in claim 1 wherein a hydrate of a metal selected from the group consisting of aluminum and beryllium is added to the electrolyte.

JAMES JOSEPH DRUMM.